Nov. 12, 1968      C. FANSHIER      3,410,139

BOTTOM READING LIQUID LEVEL GAUGE

Filed March 17, 1966      3 Sheets-Sheet 1

INVENTOR.
CHESTER FANSHIER

BY Head & Johnson

ATTORNEYS

Nov. 12, 1968   C. FANSHIER   3,410,139
BOTTOM READING LIQUID LEVEL GAUGE

Filed March 17, 1966   3 Sheets-Sheet 2

INVENTOR.
CHESTER FANSHIER

BY
Head & Johnson

ATTORNEYS

Nov. 12, 1968   C. FANSHIER   3,410,139
BOTTOM READING LIQUID LEVEL GAUGE
Filed March 17, 1966   3 Sheets-Sheet 3

INVENTOR.
CHESTER FANSHIER
BY
Head & Johnson
ATTORNEYS

United States Patent Office 3,410,139
Patented Nov. 12, 1968

3,410,139
BOTTOM READING LIQUID LEVEL GAUGE
Chester Fanshier, P.O. Box 76, Bartlesville, Okla. 74003
Filed Mar. 17, 1966, Ser. No. 535,058
9 Claims. (Cl. 73—298)

ABSTRACT OF THE DISCLOSURE

This invention relates to a liquid level gauge for a vessel providing means of reading the liquid level in the vessel on the lower portion of the vessel and includes a vertical externally threaded elevating screw rotatably supported within the vessel, means at the external lower portion of the vessel for rotation of the screw, a traveling head having an opening therein threadably received on the elevating screw, the height of the head being positionable by the rotation of the elevating screw, a flexible flow tube member having an intake carried by the traveling head and the discharge end thereof communicating with the exterior of the vessel, and a valve means exterior of the vessel for selectably opening and closing the flow tube.

---

This invention relates to a liquid level gauge. More particularly, the invention relates to a gauge for use with a vessel providing means whereby the gauge can be read from the lower portion of the vessel. Still more particularly the invention relates to a liquid level gauge of a type particularly adaptable for use in railway tank cars and the like, including means whereby the operator can read the gauge from the lower portion of the tank car.

Most of the gauges currently used to measure the liquid level in vessels, such as tank cars, barges, and so forth, are top mounted. This generally requires the operator to climb upon the tank to read the gauge. This, of course, is disadvantageous, not only from the safety point, but also climbing onto and off of vessels is time consuming.

In recent years interest has increased in bottom loaded tanks. Some bottom loaded railway tank cars are already in use. One problem which has arisen in connection with such bottom loaded tank cars is that there is available no successful gauge which is adaptable to be read from the bottom of the tank car.

It is therefore an object of this invention to provide a liquid level gauge for indicating the level of liquids within a vessel, the gauge being adaptable to be read from the lower portion of the vessel.

Another object of this invention is to provide a liquid level gauge for use with a tank car and the like including means whereby the level of liquid in the tank car can be determined from either side of the lower portion of the vessel.

These general objects and more specific objects of the invention will be fulfilled by the devices set out in the following description and claims, taken in conjunction with the attached drawings in which:

Figure 1:
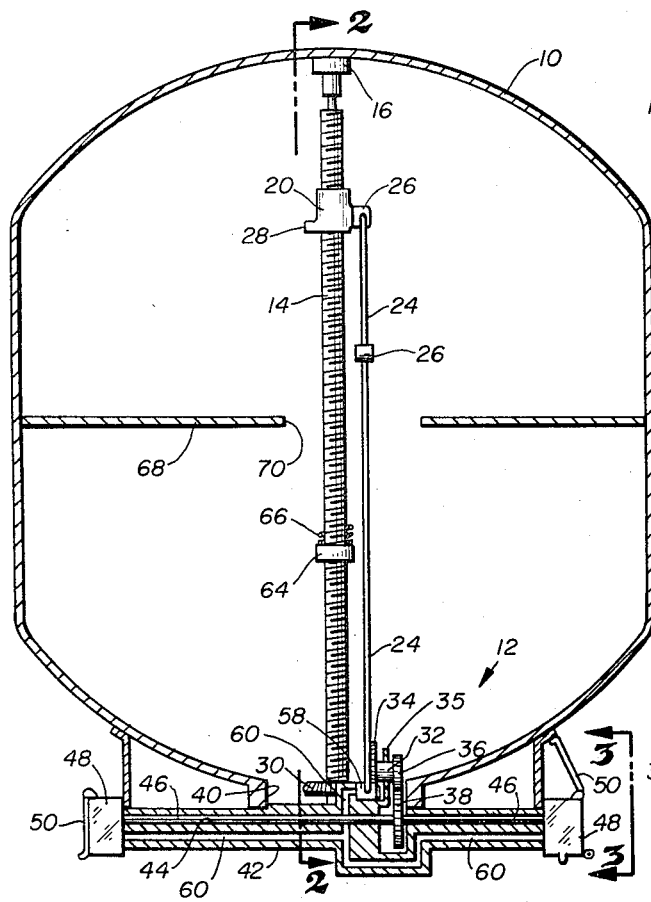
FIGURE 1 is a cross-sectional view taken in a plane perpendicular the axis of an elongated vessel, such as a tank car, showing a liquid level gauge of this invention.
Figure 2:
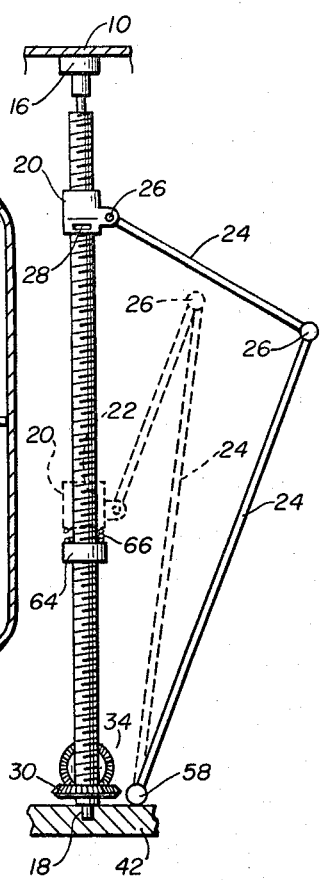
FIGURE 2 is a side view of the internal portion of the liquid level gauge of FIGURE 1.
Figure 3:
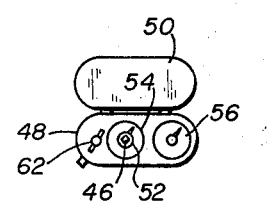
FIGURE 3 is a front view of the indicating dial case portion of the liquid level gauge of FIGURE 1.

Referring now to the drawings and first to FIGURES 1, 2 and 3, an embodiment of the invention is illustrated. The invention as shown is adapted for use to gauge the fluid level in a tank car, a use to which the invention is particularly adaptable. The tank car is shown in cross-section and is generally indicated by the numeral 10. The invention will be described as it particularly relates to a tank car, however, it is understood that the principles of the invention are equally adapted to any type of vessel. The tank car 10 is typically an elongated vessel. The cross-sectional views of FIGURE 1, and of the other figures showing the vessel, are taken in a plane perpendicular the longitudinal axis of the vessel. Vessel 10 has a lower portion generally indicated by the numeral 12. Most tank cars 10 are of such dimensions that present types of gauges require the operator to climb upon the top of the tank car. The purpose of this invention is to provide a gauge which can be operated from the lower portion 12 of the tank car.

Positioned in the vessel 10 is an externally threaded elevating screw 14. The elevating screw 14 is in vertical position and is supported by a top bearing 16 and a bottom bearing 18. The threads on the exterior of elevating screw 14 are preferably double or triple threads to achieve a more rapid threaded advance as it is rotated.

A traveling head 20, having a threaded opening 22 therein (see dotted position of FIGURE 2) is received on the elevating screw 14 so that its vertical height within the vessel 10 is determined by the rotation of the elevating screw. Communicating with the traveling head 20 is a flexible flow tube 24. The tube 24 being described as flexible means either that it is joined, such as in FIGURES 1 and 2, or that it is continuously flexible, such as will be described later with reference to FIGURE 7. In the illustration of FIGURES 1 and 2 the tube 24 has a fluid conducting joint 26 intermediate its end. Traveling head 20 has a fluid inlet opening 28 therein which is in communication, by way of a second fluid conducting joint 26, with tube 24.

Affixed to the lower end of elevating screw 14 is a horizontal beveled gear 30. Rotatably supported in the vessel lower portion 12 is a short shaft 32 having a vertical beveled gear 34 at one end which meshes with the horizontal beveled gear 32. The other end of the shaft 32 has a pinion gear 36 which meshes with a shaft gear 38.

Vessel 10 has an opening 40 in the lower portion 12 which is closed by a housing 42 having a horizontal axial opening 44. The opening 44 which is perpendicular to the longitudinal axis of the vessel 10 rotatably receives a drive shaft 46, which in turn supports the shaft gear 38. Supported to the vessel at each outer end of housing 42 is an indicating dial case 48, each of which receives one end of the drive shaft 46. Each of the indicating dial cases 48 is closed by a lid 50.

FIGURE 3 shows the arrangement of the interior of the indicating dial case with the lid opened. Each end of the drive shaft 46 is equipped with a crank receiving member 52 into which the end of a crank may be inserted, the crank not being shown in FIGURES 1, 2 and 3. By means of such a crank, shaft 46 may be manually rotated from either side of the lower portion of the vessel 10.

In FIGURE 3 two indicating dial mechanisms 54 and 56 are shown. Indicating dial 54 is directly connected to the end of shaft 46. By means of a pointer the increments of rotation of the shaft 46 are indicated. Indicating dial mechanism 56 is connected by gears or otherwise to indicate increments proportional to each revolution of the shaft 46 by means commonly known and not specifically illustrated herein.

The lower portion of flow tube 24 connects with a third conducting joint 58 which communicates with a fluid passage 60 in housing 42. The fluid passage 60 extends to each of the indicating dial cases 48 and in each case the fluid passageway is closed by a flow control valve 62 (see FIGURE 3).

In most tank gauge installations, particularly on tank cars, it is not required that fluid level be measured in the lower portion of the vessel. To prevent the traveling head 20 from being lowered beyond the desired low point a set collar 64 is secured to the exterior of elevating screw 14. The provision of threads on the elevating screw thread 14 below the set collar 64 is obviously arbitrary as they serve no function. To prevent the jamming of the traveling head 20 against set collar 64 a shock spring 66 is positioned on the elevating screw above the set collar.

As best illustrated in FIGURE 2 the first fluid conducting joint 26 is positioned intermediate the ends of flexible flow tube 24 in such a way that the bottom portion of the flow tube is longer than the top portion. The length of the two portions of flow tube 24 is coordinated with the setting of the set collar 64 so that in the lowest position of traveling head 20 the portions of the flow tube 24 will never be parallel so as to lock the traveling head against upward travel. Reinforcing baffle 68, normally found in vessels such as tank cars, has an opening 70 cut therein to receive the internal components of the liquid level gauge. In the illustration of FIGURES 1 and 2 the flow tube 24 is arranged to bend in a direction parallel the longitudinal axis of the vessel and the opening 70 will be cut to receive such movement, however, the flow tube could be oriented to bend in a direction perpendicular to the vessel axis.

*Operation*

FIGURES 1, 2 and 3 set forth an illustration of the basic concepts of this invention and obviously a great many structural detail changes can be made without departing from the scope of the invention. The liquid level gauge of this invention is primarily adapted for measuring the elevation of liquids in pressure vessels, such as tanks containing butane, propane, and so forth, which are stored and transported under pressure. It is, however, within the purview of the invention that it may be used to detect the level of non-pressure liquids in which event certain changes would be required in the details, but not the essence, of the invention. For instance, when non-pressure liquid levels are to be detected the flow tube 24 would be of a larger diameter permitting freer fluid flow therethrough and it would be arranged in such a way that the length above and below the first fluid conducting joint 26 would be equal so that as the head 26 travels up and down on the elevating screw 14 no portion of the fluid flow path is above the level of the fluid in the vessel.

The liquid level gauge is utilized to detect the fluid level in the vessel 10 in this manner: An operator works at the lower portion of the vessel and therefore is absolved of the necessity of climbing onto the top of the vessel, in the arrangement of FIGURE 1 the operator may work at either side of the vessel. The operator first opens lid 50 to the indicating dial case 48. A removable crank is inserted into the crank receiving member 52 affixed to the end of the drive shaft 46. The operator may then rotate the crank to move the traveling head 20 to the maximum upper elevation. Valve 62 may be slightly opened. The intake slot 28 being above the liquid level, a small amount of gas will flow through the intake slot 28, flexible flow tube 24, flow passage 60 and out through valve 62. The operator may then turn the crank, rotating the drive shaft 46, which rotation is transferred through shaft gear 38, spur gear 36, pinion gear 34, and beveled gear 30 to rotate elevating screw 14, moving the traveling head 20 downwardly. The elevation of the intake slot 28 in traveling head 20 will be reflected on dials 54 and 56, which may be calibrated, for instance, so that dial 54 shows elevation in increments of one-quarter inch and dial 56 in feet, or any other indicating increments desired may be provided. As the traveling head 20 is moved downwardly by the rotation of elevating screw 14 the intake slot 28 eventually encounters the liquid level, upon which liquid is taken into the intake slot and discharged from valve 62. The operator will immediately sense cessation of gas flow from the valve 62 as soon as liquid is encountered. The liquid level is thereby indicated on dials 54 and 56.

Only a very minute amount of liquid and gas flow from valve 62 is required to give indication of the height of liquid within the vessel. Obviously the operator could start with the traveling head 20 in the lower portion of the vessel within the fluid and move it upwardly to detect the level of the liquid in the vessel.

The arrangement of FIGURE 1 provides indicating dial cases 48 at each side of the lower portion of the vessel. Obviously the gauge may be limited to an indicating dial case 54 on only one side of the vessel.

In the arrangement of FIGURES 1, 2, and 3 of the invention the provision of stuffing boxes, bearings and so forth have not been illustrated since such would be within the skill of any manufacturer of such equipment.

*Alternate embodiments*

Figure 4:
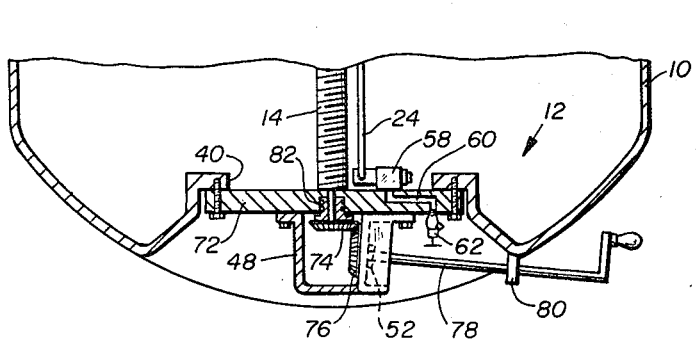
FIGURE 4 is a segmented cross-sectional view of the lower portion of a vessel showing an alternate arrangement of the liquid level gauge of FIGURE 1.

FIGURES 4–10 show alternate embodiments of the basic concept of this invention. Referring first to FIGURE 4, an alternate embodiment of the invention is illustrated. Opening 40 in the lower portion of the vessel receives a flange 72 which is the counterpart of housing 42 of FIGURE 1. Opening 40 may be arranged, as illustrated, so that the flange 72 is recessed within the confines of the vessel but exterior to it. Indicating dial case 48 is affixed directly to the flange 72. A horizontal beveled gear 74 is affixed directly to an exteriorly extending end of the elevating screw 14 and is meshed with a horizontal beveled gear 76 rotatably supported by the dial case. A crank receiving member 52 affixed to the beveled gear 76 receives a crank 78 which, preferably is of the removable type inserted only when the gauge is in use. The crank 78 is of the type utilized in the embodiment of FIGURES 1, 2, and 3. A support bracket 80 may be affixed to the vessel to give lateral support to the crank 76, the bracket 80 having an opening (not shown) which removably rotatably receives and supports the crank. The third fluid conducting joint 58, flow passage 60, and flow control valve 62 function the same way as described in FIGURE 1. A stuffing box 82 is provided to prevent fluid leakage at the portion of the elevating screw 14 extending through the flange 72.

The use of the gauge illustrated in FIGURE 4 is exactly the same as previously described. FIGURE 4 illustrates the arrangement wherein the gauge is usable only from one side of the tank, however, it is obvious that a second beveled gear 76 could easily be provided with a crank 78 extending in the opposite direction to afford reading of the gauge from either side of the vessel. The embodiment of FIGURE 4 has the advantages of improved simplicity plus the fact that all of the gauge components which are exterior of the vessel are contained within the vessel recess to diminish the chance of physical damage.

Figure 5:
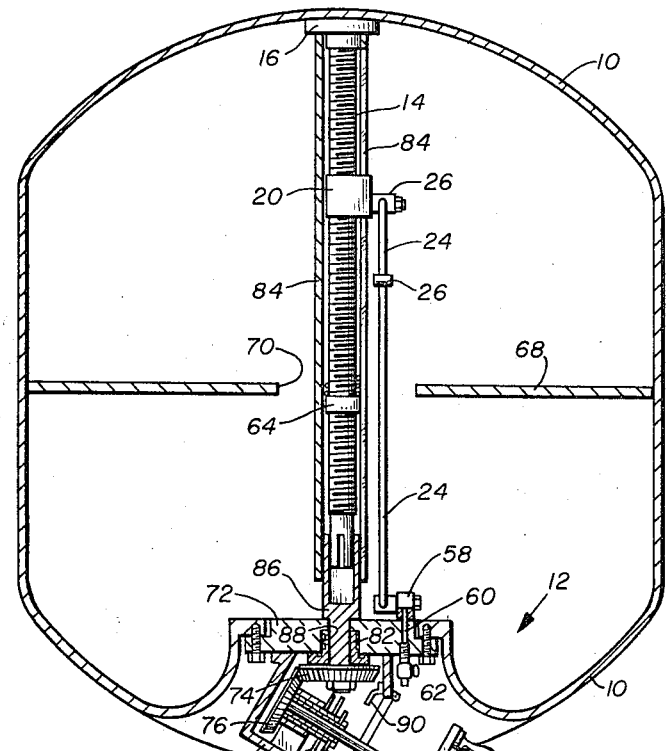
FIGURE 5 is a cross-sectional view of a vessel showing an additional alternate arrangement of the liquid level gauge of this invention.
Figure 6:
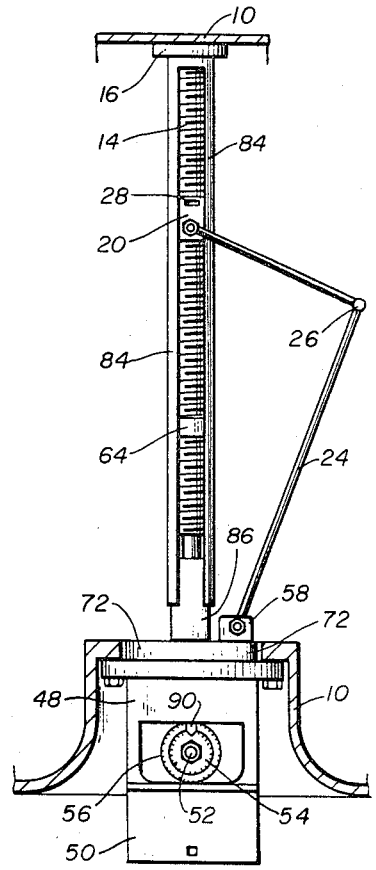
FIGURE 6 is a partial side view of the liquid level gauge of the arrangement of FIGURE 5.

FIGURES 5 and 6 illustrate additional alternate embodiments of the invention. One important improvement of FIGURES 5 and 6 is the provision of a slotted tubular encasement 84 which slidably receives the traveling head 20 to prevent the rotation of the traveling head as the elevated screw 14 is rotated.

In FIGURE 1 the upper bearing 16 is preferably of the type permitting a degree of longitudinal movement of the elevating screw 14 so as to take care of any contraction or expansion of the vessel 10. In the arrangement of FIGURES 5 and 6 the upper bearing 16 supports the elevating screw 14 in a non-axial displacement arrangement. To afford means to compensate for contraction and expansion of the vessel 10 a vertical drive shaft 86 is are drive shafts 102 which extend through openings 104 in lower end of elevating screw 14. Vertical drive shaft 86 extends through an opening 88 in flange 72 and receives, provided which slidably but non-rotatably receives the the beveled drive gears 96, by way of universal joints 100, at the lower end thereof, beveled gear 74 which functions as the same element described in FIGURE 4. In the arrangements of FIGURES 5 and 6 the drive beveled gear 76 meshes on the opposite side of the beveled gear 74 as compared to the arrangement of FIGURE 4. While the function is the same, the arrangement of FIGURE 5 permits the gauge mechanism to be more easily recessed within exterior portions of the vessel.

The operation of the device embodied in FIGURES 5 and 6 is the same as described with reference to FIGURE 4. FIGURE 6 illustrates the arrangement wherein the indicating dial mechanisms 54 and 56 are coaxial. The outer dial 56 is typically arranged to move one increment with each revolution of the interior dial 54.

The slotted encasement 84 which functions to slidably and non-rotatably receive the traveling head 20 may be of a variety of arrangements. For instance, rods supported adjacent to and parallel to elevating screw 14 may be utilized to accomplish the same purpose and other alternate arrangements will be readily suggested.

Figure 7:
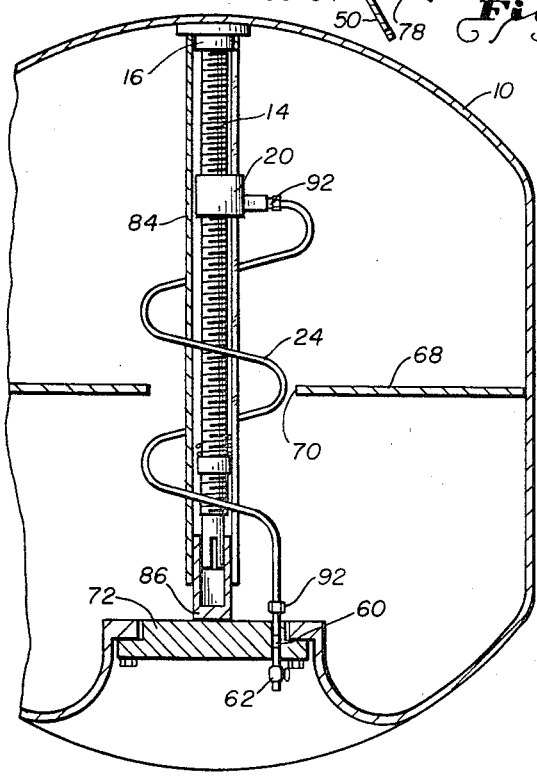
FIGURE 7 is a cross-sectional view of a vessel showing the use of a flexible tube as a portion of the liquid level gauge, the portion of the gauge whereby rotation is imparted to the elevated screw not being shown in this view.

FIGURE 7 shows an alternate arrangement differing from the arrangements of FIGURE 5 only by the provision of a different type of flexible flow tube. Whereas in the embodiments described previously the flow tube has been illustrated as being composed of joined rigid tube portions, in FIGURE 7 the flow tube is of a continuously flexible type, composed of material such as plastic or rubber. Flexible tube 24 can be loosely coiled around the elevating screw 14, as illustrated, to prevent its entanglement. Hose couplings 92 connect the tube at one end to the traveling head 20 and at the other end to the fluid passage 60 in flange 72.

Figure 8:
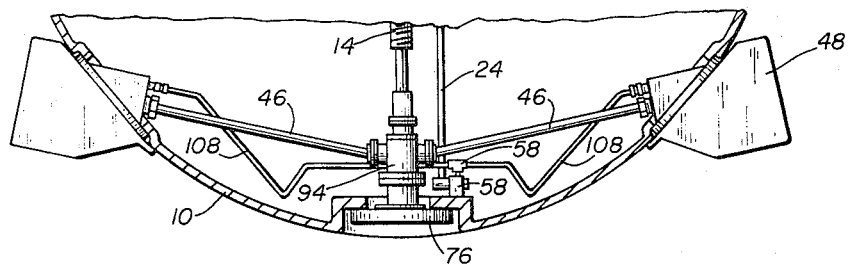
FIGURE 8 is a segmented cross-sectional view of a lower portion of a vessel showing an additional alternate arrangement of the invention and showing means whereby the liquid level gauge may be operated from either side of the lower portion of the vessel.
Figure 9:
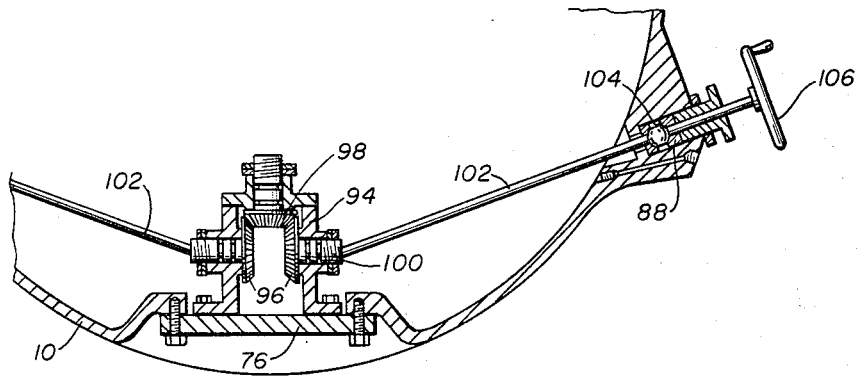
FIGURE 9 is a cross-sectional view as shown in FIGURE 8 but showing the gearing arrangement and drive shaft stuffing box in more detail.

In FIGURES 8 and 9 a gear housing 94 is supported to flange 76 within the vessel. Rotatably supported in the gear housing 94 are paralleled spaced vertical beveled gears 96, each of which engage horizontal beveled gear 98 affixed either directly to the lower end of elevating screw 14, or to the lower end of a vertical drive shaft 86 as utilized in the embodiment of FIGURE 5. Connected to each side of the lower portion of the vessel. The openings 104 are sealed with stuffing boxes 88.

Positioned on the exterior of the vessel at each of the openings 104 is an indicating dial case 48 (not shown in FIGURE 9) which includes the indicating dial mechanisms and flow control valve such as previously illustrated and described. In the arrangement of FIGURES 8 and 9 a crank wheel 106 may be self-contained within the indicating dial case 48 in place of the removable crank utilized with the previously described embodiments.

FIGURES 8 and 9 show the gear housing 94 arranged so that drive beveled gears 96 are perpendicular, necessitating the use of universal joints 100. It can be seen that the housing 94 can be arranged so that the beveled drive gears 96 are inclined and thereby perpendicular to drive shafts 102, obviating the universal joints 100. As shown in FIGURE 8 flow tube extensions 108 communicate the third fluid conducting joint 58 at the lower end of flexible flow tubing 24 to each of the indicating dial cases 48.

The embodiment of FIGURES 8 and 9 provide an arrangement wherein the indicating mechanisms, including crank wheel 106, may be arranged at working height so that the operator does not need to bend down while using the tank gauge.

Figure 10:
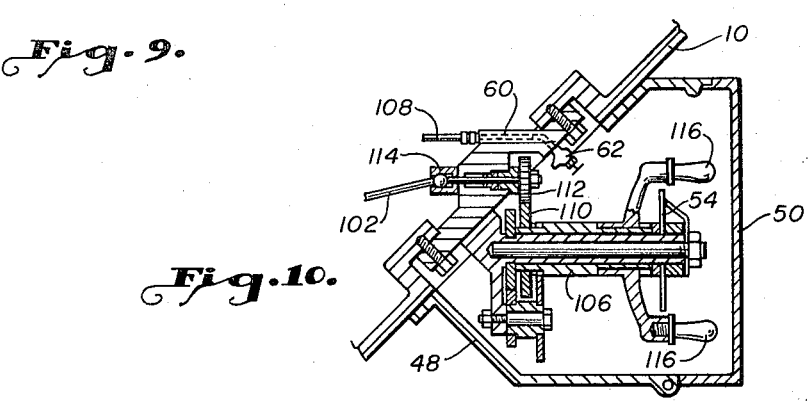
FIGURE 10 is a partial cross-sectional view showing still a different alternate arrangement of the invention providing means of operation of the gauge from the lower exterior portion of a tank.

FIGURE 10 shows an alternate arrangement for use with the embodiments of FIGURES 8 and 9. The distinction in FIGURE 10 is that a drive and pinion gear 110 are positioned exteriorly of the vessel, the pinion gear being coupled through a universal joint 114 to drive shafts 102. This arrangement permits more rapid rotation of the drive shaft 102 and thereby the elevating screw 14. The crank wheel 106 is provided with two spaced knobs 116 for improved operation.

The alternate embodiments are merely exemplary of the mechanical details wherein the essence of the invention may be incorporated in a number of ways.

Many embodiments of the invention are readily suggested which are not illustrated. For instance, the elevating screw may be replaced by other means of elevating the traveling head, such as by the use of cables and sprockets, or perforated tape. The indicating dial case, as equipment connected to it, may be designed to fold inwardly when not in use to diminish the possibility of damage.

While the invention has been described as it particularly relates to tank cars it is apparent that it is equally adaptable for use with stationary vessels. In the same manner, the gauge has been described as being calibrated in feet and inches whereas other calibration scales such as inches and quarter inches, centimeters and half centimeters, etc., may be preferred.

The embodiments set forth herein are not intended to exemplify limitations of the invention but only as examples of the many various ways in which the invention may be accomplished. These illustrated embodiments are not intended to limit the scope of the invention which is set forth in the appended claims.

What is claimed:
1. A liquid level gauge for a vessel comprising:
a vertical externally threaded elevating screw rotatably supported within said vessel;
a traveling head having an opening therein threadably receiving said elevating screw, said traveling head being height positionable by the rotation of said elevating screw;
a flexible flow tube member having an intake and discharge end, the intake end being carried by said traveling head and the discharge end having communication with the exterior of the lower portion of said vessel;
means externally of said vessel of selectably opening and closing said flow tube;
a shaft rotatably supported in the wall of said vessel in the lower portion thereof;
shaft gear means affixed to the innner end of said shaft within said vessel;
gear means affixed to said elevating screw meshing with said shaft gear means whereby the rotation of said shaft externally of said vessel rotates said elevating screw to raise and lower said traveling head; and
means coupled to said shaft calibratingly indicating the height of said traveling head in said vessel.

2. A liquid level gauge according to claim 1 wherein said tube member is a rigid tube of a length at least equal to said elevating screw, said rigid tube having a flexible fluid conducting joint intermediate its length.

3. A liquid level gauge for a vessel comprising:
a vertical externally threaded elevating screw rotatably supported within said vessel having the lower portion thereof extending sealably externally of the lower portion of said vessel;

a traveling head having an opening therein threadably receiving said elevating screw, said traveling head being height positionable by the rotation of said elevating screw;

a flexible flow tube member having an intake and discharge end, the intake end being carried by said traveling head and the discharge end having communication with the exterior of the lower portion of said vessel;

means externally of said vessel of selectably opening and closing said flow tube;

a shaft rotatably supported externally of said vessel;

means at one end of said shaft for the manual rotation thereof;

a vertical gear affixed to the other end of said shaft;

a horizontal gear affixed to said externally extending lower portion of said elevating screw meshed with said vertical gear affixed to said shaft whereby the rotation of said shaft rotates said elevating screw to raise and lower said traveling head; and means coupled to said shaft calibratingly indicating the height of said traveling head in said vessel.

4. A liquid level gauge according to claim 3 wherein said tube member is a rigid tube of a length at least equal to said elevating screw, said rigid tube having a flexible fluid conducting joint intermediate its length.

5. A liquid level gauge according to claim 3 wherein said shaft extends to each side of the lower portion of said vessel and has said vertical gear affixed thereto intermediate the ends, said shaft having crank receiving means at each end thereof.

6. A liquid level gauge for a vessel comprising:
a vertical externally threaded elevating screw rotatably supported within said vessel;

a traveling head having an opening therein threadably receiving said elevating screw, said traveling head being height positionable by the rotation of said elevating screw;

a flexible flow tube member having an intake and discharge end, the intake end being carried by said traveling head and the discharge end having communication with the exterior of the lower portion of said vessel;

means externally of said vessel of selectably opening and closing said flow tube;

a horizontal beveled gear affixed to said elevating screw at the lower end thereof within said vessel;

a vertical beveled drive gear rotatably supported within said vessel and meshed with said horizontal beveled gear; and a drive shaft rotatably and sealably extending through the wall of the lower portion of said vessel, the inner end of said drive shaft affixed to said horizontal beveled drive gear and the outer end of said drive shaft having a crank receiving means for the manual rotation thereof whereby the rotation of said drive shaft externally of said vessel rotates said elevating screw to raise and lower said traveling head; and means coupled to said shaft calibratingly indicating the height of said traveling head in said vessel.

7. A liquid level gauge according to claim 6 wherein said tube member is a rigid tube of a length at least equal to said elevating screw, said rigid tube having a flexible fluid conducting joint intermediate its length.

8. A liquid level gauge for a vessel comprising:
a vertical externally threaded elevating screw rotatably supported within said vessel;

a traveling head having an opening therein threadably receiving said elevating screw, said traveling head being height positionable by the rotation of said elevating screw;

a flexible flow tube member having an intake and discharge end, the intake end being carried by said traveling head and the discharge end having communication with the exterior of the lower portion of said vessel to either side thereof;

a horizontal beveled gear affixed to said elevating screw at the low end thereof within said vessel;

a first and a second beveled vertical drive gear rotatably supported with said vessel each meshed with said horizontal beveled gear, said drive gears being positioned to engage opposite points on the periphery of said horizontal beveled gear;

a first drive shaft rotatably and sealably extending through the wall of the lower portion of said vessel at one side thereof, the inner end of said first drive shaft affixed to said first vertical beveled drive gear;

a second drive shaft rotatably and sealably extending through the wall of the lower portion of said vessel at the side thereof opposite said side through which said first drive shaft extends, the inner end of said second drive shaft affixed to said second vertical beveled drive gears;

crank receiving means at the outer end of each drive shaft for the manual rotation thereof whereby said elevating shaft may be rotated from either side of said vessel to raise and lower said traveling head;

means externally of said vessel of selectably opening and closing said flow tube at either side thereof adjacent the outer end of each of said drive shafts; and means coupled to each of said shafts calibratingly indicating the height of said traveling head in said vessel.

9. A liquid level gauge according to claim 8 wherein said tube member is a rigid tube of a length at least equal to said elevating screw, said rigid tube having a flexible fluid conducting joint intermediate its length.

References Cited

UNITED STATES PATENTS

| 254,369 | 2/1882 | Puffer | 73—298 XR |
| 2,014,739 | 9/1935 | Knight | 73—298 |

S. CLEMENT SWISHER, Acting Primary Examiner.

D. O. WOODIEL, Assistant Examiner.